Dec. 20, 1927.

L. MYERS 1,653,019

NUT CRACKING MACHINE

Filed April 23, 1925

INVENTOR
Leo Myers
ATTORNEY

Dec. 20, 1927.

L. MYERS 1,653,019

NUT CRACKING MACHINE

Filed April 23, 1925   4 Sheets-Sheet 3

INVENTOR
Leo Myers
BY
ATTORNEY

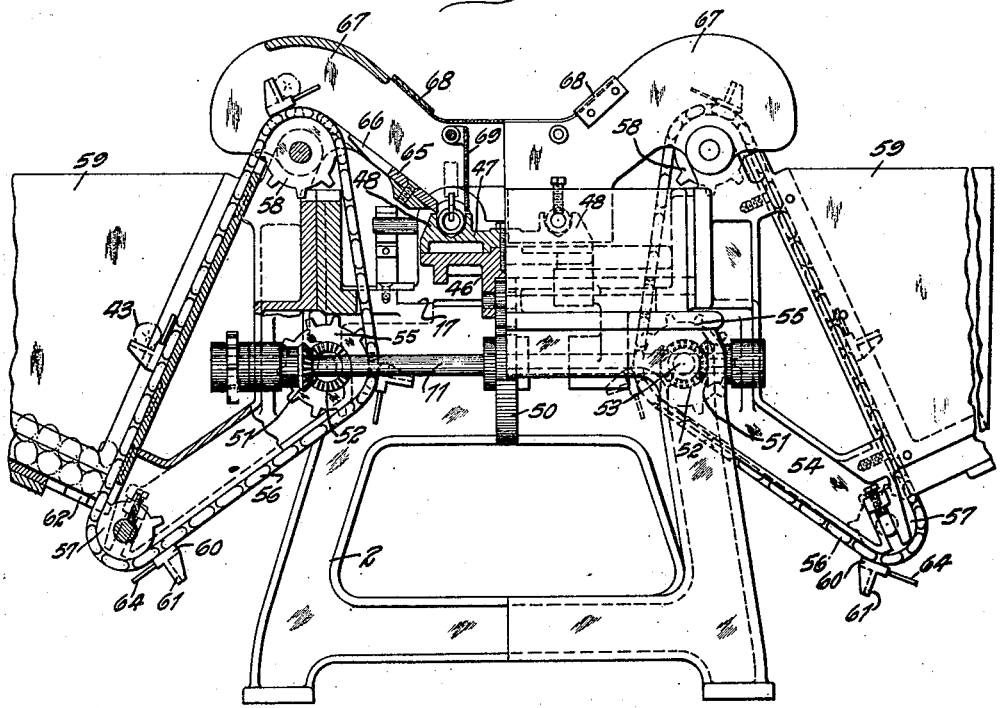

Patented Dec. 20, 1927.

1,653,019

UNITED STATES PATENT OFFICE.

LEO MYERS, OF KIRKWOOD, MISSOURI.

NUT-CRACKING MACHINE.

Application filed April 23, 1925. Serial No. 25,233.

This invention pertains to nut cracking machines.

One of the objects of this invention is to provide a machine which will crack nuts of varying sizes in a simple and effective manner and without danger of mashing the kernel.

Another object is to provide a simple and effective discharging mechanism which will discharge the cracked nut without danger of clogging or fouling.

Another object is to provide improved mechanism for feeding the nuts and for orienting the same in cracking position.

Further objects will appear from the following description taken in connection with the accompanying drawings in which:

Figure 4 is a section on line 4—4 of Figure 1;

Figure 5 is a view similar to Figure 3, but showing the parts in the position assumed when cracking the nut; and Figure 6 is a view similar to Figure 5 illustrating the operation of discharging the cracked nut.

Figure 1:
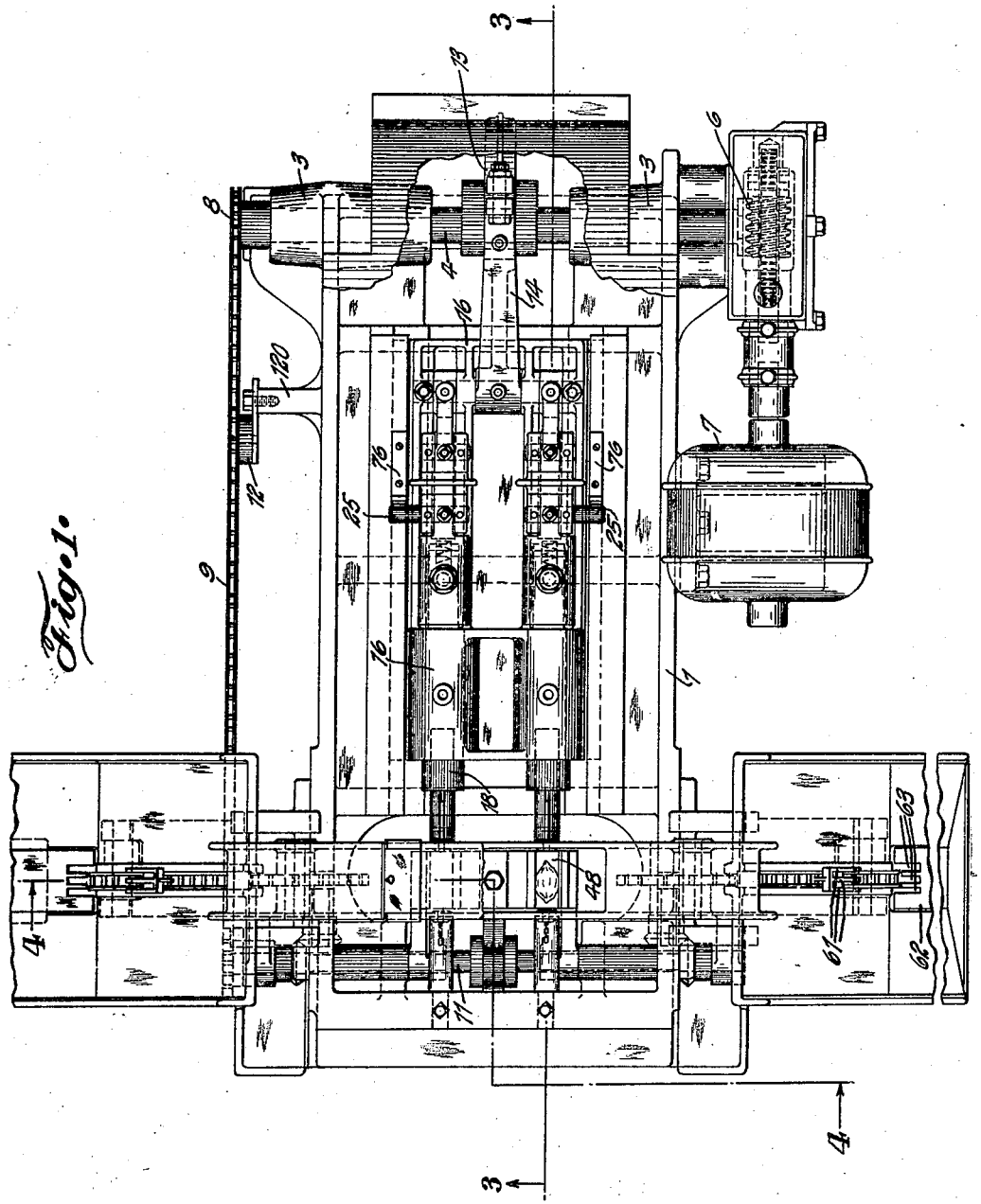
Figure 1 is a plan view of a nut cracking machine embodying this invention.
Figure 2:
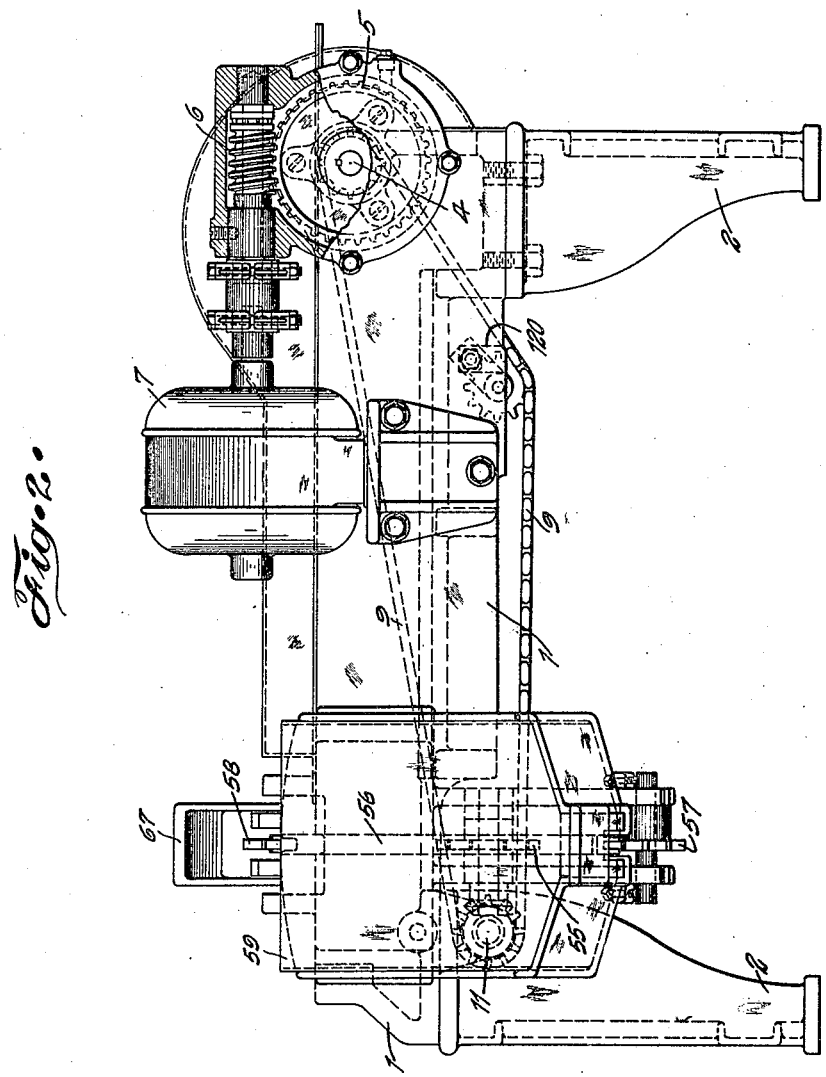
Figure 2 is a side elevation of the same.

Referring to the accompanying drawings, 1 designates the frame of the machine which may be supported on suitable legs 2. Mounted in suitable bearings 3 at one end of the frame 1 is a main drive shaft 4 carrying a worm wheel 5 engaged by a worm 6 driven by a suitable motor 7 mounted on a bracket on the side of the frame 1. The shaft 4 carries at its end a sprocket adapted to drive by means of a chain 9 a second sprocket 10 on a counter shaft 11 mounted in suitable bearings at the other end of the frame 1. An idler sprocket 12 mounted for adjustment on a bracket 120 on the side of the frame serves to keep the chain 9 taut.

Figure 3:
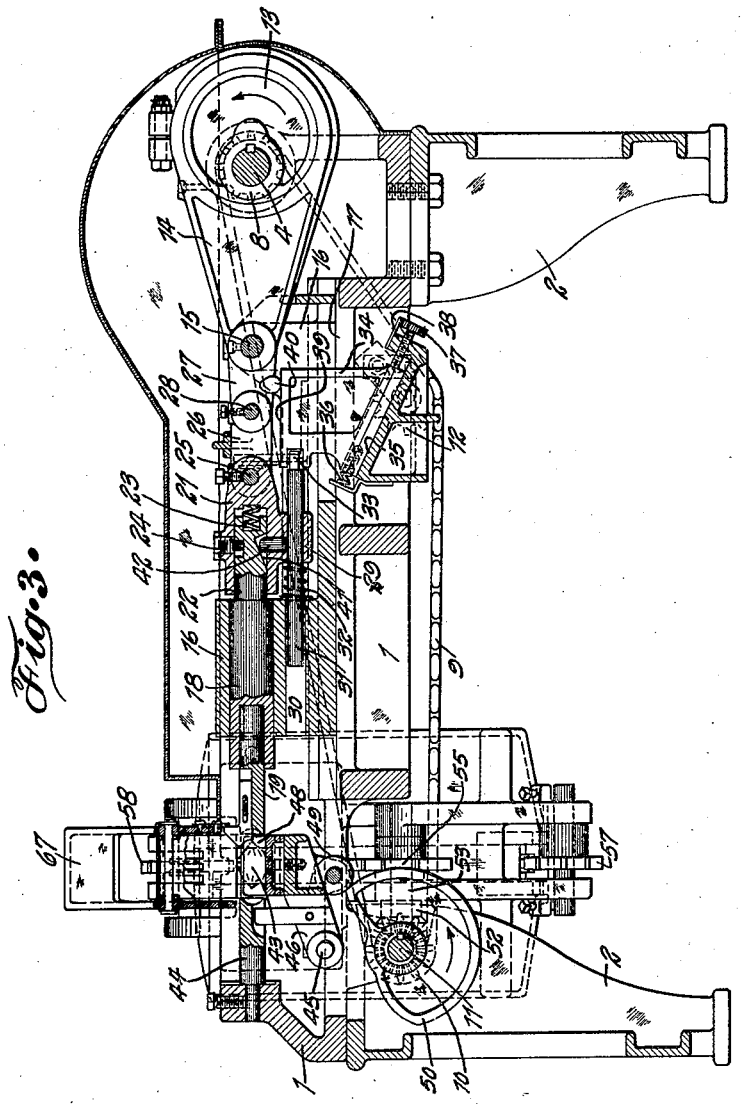
Figure 3 is a section on line 3—3 of Figure 1.

The shaft 4 has fixed thereto an eccentric 13 engaging a pitman 14 pivoted at 15 to a slide 16 mounted to slide on ways 17 on the frame 1. The operation of the eccentric 13 and the pitman 14 will, therefore, give the slide 16 a reciprocating movement on the frame 1 in accordance with the rotation of the shaft 4. Arranged at the opposite end of the slide 16 is a pair of cylindrical guideways adapted to receive a pair of sliding plungers 18 each provided with a protruding shank 19 equipped at its end with a socket 20 adapted to engage the nut for cracking the same. Each plunger 18 is provided with a movable head 21. The head 21 is bored to receive a reduced shank 22 formed on the plunger. The shank 22 is provided at its end with a socket adapted to receive a coiled compression spring 23 which is confined between the plunger and the base of the bore in the head. The shank is maintained in place in the head by means of a screw 24 engaging a socket in the shank as shown in Figures 3, 5 and 6. This socket is made large enough to permit a certain amount of play longitudinally of the shank in the head. The head 21 has pivoted thereto at 25 one arm 26 of a toggle, the other arm 27 of which is pivoted at 15 to the slide 16. The arms 26 and 27 of the toggle are pivoted to each other at 28. It will be seen that so long as this toggle is kept straight by means to be hereinafter described the reciprocating movement of the slide 16 will be imparted to the plungers 18 by said toggle.

Slidably mounted in an extension 29 on the head 21 and working in a guide-way 30 in the slide 16 is a rod 31. This rod has mounted thereon a compression spring 32 abutting at one end against the slide 16 and at its other against the extension 29. This spring operates to move the head 21 to the right (Figures 3, 5 and 6) when said head is released for such movement as will presently be explained. The rod 31 is connected at 33 with an abutment or wedge 34 mounted to slide on an inclined guide-way 35 on the frame 1. The wedge 34 is urged downwardly along said guide-way by a spring 36 against an adjusting screw having a notched head 37 for co-operation with an index or detent 38 for setting the adjustment of the wedge 34. This wedge is provided with an upper flat face 39 adapted to engage an abutment 40 on the arm 27. It will be seen that when properly adjusted the wedge 34 by engagement with the abutment 40 will maintain the toggle 26 and 27 in alinement during rotation of the shaft 4 in the direction indicated by the arrow in Figure 3. During such rotation the slide 16 moves to and fro on the frame 1 while the abutment 40 slides along the top face 39 of the wedge. The reciprocating movement of the slide is thus imparted to the plunger 18.

The shank 22 of the plunger is provided with a recess having an inclined face 41 adapted for engagement with a clamping stud 42 adapted to engage the rod 31 to clamp the same against movement in the head 21. The operation of this part of the machine will now be clear. The reciprocating movement of the slide 16 is imparted to the plunger 18 through the toggle 26 and 27 kept straight by the engagement of the abutment 40 with the top face of the wedge 34. The plunger 18 is thus moved to the left, Figure 3, to engage the nut 43 previously placed in cracking position. This movement forces the nut against the stationary abutment or jaw 44 fixed in the frame 1. As the nut comes against the stationary abutment the plunger 18 will be momentarily arrested while the head 21 continues its movement, compressing the spring 23. The stud 42 is thus moved into engagement with the inclined face 41. Further movement of the head 21 will then cause the stud 42 to clamp the rod 31 so that this rod will be carried along with the head 21. The rod 31 in turn moves the wedge 34 to the left, Figure 3. This causes the wedge to move upward on the inclined guide 35. In so doing it lifts the abutment 40 so as to break the toggle 26 and 27, whereupon the spring 32 will move the head 21 to the right as shown in Figure 6 thus releasing the nut. By means of the screw 37 the wedge 34 may be adjusted so as to adjust the amount of movement required to break the toggle. This adjustment can be made to a very fine degree so that any desired degree of pressure may be exerted upon the nut before the toggle is released.

Pivoted on the frame 1 is an arm 46 which has mounted thereon a bracket 47 provided with a pair of receivers or cradles 48, one opposite each of the plungers 18. The receivers 48 are adapted to receive the nut and to hold the same in cracking position, and for this purpose they are arranged to stand between the shank 19 and the abutment 44 when the arm 46 is in raised position as shown in Figures 3 and 5. This arm carries a cam roll 49 adapted for co-operation with a cam 50 carried by the shaft 11. This cam is so timed with relation to the movement of the plungers that it will lower the arm 46 to the position shown in Figure 6 after the cracking operation is completed and so as to discharge the cracked nut.

The shaft 11 carries a pair of beveled gears 51 cooperating with a pair of similar gears 52 on stub shafts 53 suitably mounted in brackets 54 attached to the frame 1. Each stub shaft carries a sprocket 55 adapted to drive by means of a chain 56 two other sprockets 57 and 58 carried on stub shafts also mounted on the brackets 54. Also mounted on each of the brackets 54 is a hopper 59 for receiving the uncracked nuts, the arrangement being such that the chain 56 passes through the hopper in its upward travel over the sprockets. Each chain is provided with a series of holders or buckets 60, each adapted to pick up and carry a nut as it passes through the hopper. Each bucket is formed with a series of outwardly projecting teeth or arms 61 and the bottom of the hopper 59 is provided with a gate 62 having corresponding slots 63 adapted to permit passage therethrough of the teeth 61. Each bucket is further provided with an upstanding pin 64 which stands above the bucket in such a position as to prevent the lodgement of more than one nut upon the bucket as it passes through the hopper. The chain 56 is thus adapted, when driven by the sprocket 55 to pick up successively one nut at a time from the hopper and after carrying it over the sprocket 58 to discharge it upon a chute 65 down which it may slide into the receiver 48. The upper part of the chute 65 is also provided with slots 66 adapted to permit the passage of the teeth 61 of the bucket therethrough. Each chute is enclosed by a housing 67 which may be provided with a window 68 through which the operation may be observed. Mounted within the housing and opposite the chute 65 is a stop or guide plate 69 adapted to guide the nut into the receiver 48 and to prevent its over-shooting the same.

In order to prevent the lodgement of fragments or nut shell in the cracking jaws, clearing elements are provided as illustrated in Figures 3, 5 and 6. The shank 19 is provided with a longitudinal slot adapted to receive a sliding plate 70 having an upstanding projection 71 at its outer end. This plate is maintained in place by a pin and slot connection 72. As the plunger is retracted to the position of Figure 6 the projection 71 engages a stop plate 73 mounted on the housing 67 so as to drive the plate 70 out of the shank to dislodge any fragment which may have caught in the jaw 20. Similarly the arm 46 carries a plate 74 adapted to enter a recess 75 in the stationary jaw 44. As the arm 46 drops to discharge the cracked nut, the arm 74 sweeps out of the recess 75 to dislodge fragments of shell.

After the cracking operation has been completed and the eccentric 13 retracts the slide 16, the pivot pin 25 of each toggle, which is arranged to protrude laterally as illustrated in Figure 1, comes into engagement with a spring bracket 76 on the frame, and is retarded thereby so that further movement of the pitman 14 will straighten the toggle. In the operation of this machine, therefore, the nuts to be cracked are put into the hoppers 59. When the motor 7 is started the conveyor chains 56 move upwardly through the hoppers and the buckets 61 each pick up one nut therefrom. The pin 64 prevents the lodgement of more than one nut and conditions of equilibrium provide that a long nut will practically always assume a horizontal position on the bucket. As each bucket passes over a sprocket 58 its nut is deposited upon the chute 65, the teeth of the bucket passing through the slots 66. The nut then passes down the chute and is guided by the plate 69 into the receiver or plate 48. When the nut has thus been placed in cracking position the eccentric 13 moves the slide 16 to the left (Figure 3) so as to carry the plunger 18 and the cracking jaws 19 against the nut which in turn is forced against the stationary abutment 44. The plunger is then arrested and operates to clamp the rod 31 as previously described. This carries the wedge 34 forwardly so as to break the toggle and release the pressure on the nut, the movement of the plunger, between the time that the bar 29 is clamped and the time that the toggle is released by the wedge, being adjustable so as to put just the required cracking pressure upon the nut. This adjustment is accomplished by the screw 37 and maintained by the detent 38. It will thus be seen that the adjustable wedge is adapted to provide a definite and predetermined engagement of the nut for cracking. As soon as the toggle is released the cracking jaw is instantly retracted.

When the cracking operation is completed the receiver carrying the cracked nut is dropped vertically from its position between the jaws and is tipped to discharge the cracked nut. At the same time the clearing elements 70 and 74 operate to clear the jaws. It is thus insured that the machine is at all times kept free of nut shell fragments and other débris.

It is obvious that various changes may be made in the details of construction without departing from the spirit of this invention; it is to be understood, therefore, that this invention is not to be limited to the specific details shown and described.

Having thus described the invention what is claimed is:

1. A nut-cracking machine, comprising, means for placing a nut in cracking position, means engaging the nut to crack the same adapted to release the nut at a predetermined pressure thereon, and means for adjusting the extent of such pressure.

2. A nut-cracking machine, comprising, means for placing a nut in cracking position, means engaging the nut to crack the same adapted to release the nut at a predetermined pressure thereon, and an adjustable element movable with said engaging means for adjusting the extent of such pressure.

3. A nut-cracking machine, comprising, means for placing a nut in cracking position, means engaging the nut to crack the same adapted to release the nut at a predetermined pressure thereon, and an adjustable wedge movable with said engaging means for adjusting the extent of such pressure.

4. A nut-cracking machine, comprising, means for placing a nut in cracking position, releasable means movable for engaging the nut to crack the same, and means independent of but connectible with said cracking means adapted upon engagement of the nut therewith to release the same.

5. A nut-cracking machine, comprising, means for placing a nut in cracking position, a solid abutment, cracking means movable to force the nut against said abutment to crack the same, and means connectible with said cracking means and movable thereby adapted to release said cracking means at a predetermined pressure on the nut.

6. A nut-cracking machine, comprising, means for placing a nut in cracking position, a solid abutment, means movable to force the nut against said abutment to crack the same, and adjustable means independent of but connectible with said cracking means and movable thereby adapted to release said cracking means after a predetermined engagement with the nut.

7. A nut-cracking machine, comprising, means for placing a nut in cracking position, a solid abutment, means movable to force the nut against said abutment to crack the same, means movable to release said cracking means, and means actuated after a predetermined engagement of said cracking means with the nut to connect said releasing means for movement by said cracking means.

8. A nut-cracking machine, comprising, means for placing a nut in cracking position, a solid abutment, a cracking element movable to force the nut against said abutment to crack the same, releasable means for moving said element, and an adjustable element adapted for actuation upon a predetermined engagement of said cracking element with the nut to release said moving means.

9. A nut-cracking machine, comprising, means for placing a nut in cracking position, a solid abutment, a cracking element movable to force the nut against said abutment to crack the same, releasable means for moving said element, and an adjustable wedge adapted for actuation upon a predetermined engagement of said cracking element with the nut to release said moving means.

10. A nut-cracking machine, comprising, means for placing a nut in cracking position, a solid abutment, a cracking element movable to force the nut against said abutment to crack the same, releasable means for moving said element, and an adjustable wedge adapted for connection with said cracking element upon a predetermined engagement thereof with the nut to release said moving means.

11. A nut-cracking machine, comprising, a receiver for holding the nut in cracking position, longitudinally moving means for cracking the nut in said receiver, a hopper positioned laterally of said receiver, and means for conveying a nut from said hopper to said receiver, comprising a bucket having an arm thereon adapted to prevent lodgment of more than one nut therein at a time.

12. A nut-cracking machine, comprising, a receiver for holding the nut in cracking position, longitudinally moving means for cracking the nut in said receiver, a hopper positioned laterally of said receiver, and a conveyer passing through said hopper and adapted to convey a nut therefrom to said receiver, and a bucket on said conveyor having an arm adapted to prevent lodgment of more than one nut therein at a time.

13. A nut-cracking machine, comprising, a receiver for holding the nut in cracking position, means movable for cracking a nut in said receiver, means for releasing said cracking means at a predetermined pressure on the nut, and means for re-setting said cracking means.

14. A nut-cracking machine, comprising, a receiver for holding the nut in cracking position, means movable for cracking a nut in said receiver, means for releasing said cracking means at a predetermined pressure on the nut, and yielding means for re-setting said cracking means.

15. A nut-cracking machine, comprising, a receiver for holding the nut in cracking position, means movable for cracking a nut in said receiver, means for releasing said cracking means upon a predetermined engagement with the nut, and means engaging said cracking means on the return movement thereof for re-setting the same.

16. A nut-cracking machine, comprising, a receiver for holding the nut in cracking position, means for cracking the nut in said receiver, a hopper, a conveyor passing through said hopper, a bucket on said conveyor having a series of arms adapted to support a nut, and a projecting pin on said bucket adapted to prevent lodgement of more than one nut on said bucket.

In testimony whereof I affix my signature this 13th day of April, 1925.

LEO MYERS.